United States Patent [19]
Dorst

[11] Patent Number: 5,400,054
[45] Date of Patent: Mar. 21, 1995

[54] MANUALLY OPERABLE DEVICE FOR INDICATING POSITION ON A DISPLAY SCREEN

[76] Inventor: Gary L. Dorst, 3417 Oak Ave., Brookfield, Ill. 60513

[21] Appl. No.: 19,285

[22] Filed: Feb. 18, 1993

Related U.S. Application Data

[63] Continuation of Ser. No. 730,269, Jul. 12, 1991, abandoned.

[51] Int. Cl.⁶ .................................... G09G 1/00
[52] U.S. Cl. ............................ 345/167; 345/157; 345/164
[58] Field of Search ............ 340/706, 709, 710; 74/471; 345/156, 157, 163, 164, 165, 167

[56] References Cited

U.S. PATENT DOCUMENTS

| | | |
|---|---|---|
| 4,561,183 | 12/1985 | Shores . |
| 4,580,006 | 4/1986 | Hull . |
| 4,581,609 | 4/1986 | Hosogoe et al. . |
| 4,635,496 | 1/1987 | McTyre . |
| 4,670,743 | 6/1987 | Zemke . |
| 4,692,756 | 8/1987 | Clark ........................... 340/709 |
| 4,719,455 | 1/1988 | Louis ............................ 345/157 |
| 4,782,327 | 11/1988 | Kley et al. . |
| 4,793,198 | 12/1988 | Myer . |
| 4,814,760 | 3/1989 | Johnston et al. . |
| 4,831,736 | 5/1989 | Bryant . |
| 4,879,556 | 11/1989 | Duimel . |
| 4,910,503 | 3/1990 | Brodsky . |
| 4,931,781 | 6/1990 | Miyakawa .................... 340/706 |
| 4,935,728 | 6/1990 | Kley . |
| 4,954,817 | 9/1991 | Levine . |
| 5,019,677 | 5/1991 | Menen ............................ 345/179 |
| 5,086,296 | 2/1992 | Clark ............................. 340/706 |

FOREIGN PATENT DOCUMENTS

| | | | |
|---|---|---|---|
| 60-120424 | 6/1985 | Japan ............................. 345/179 |
| 2076602 | 5/1980 | United Kingdom ............ 340/706 |

*Primary Examiner*—Jeffery Brier
*Assistant Examiner*—A. Au
*Attorney, Agent, or Firm*—Roper & Quigg

[57] ABSTRACT

A position indication device, e.g., for controlling the position of a cursor or other object on the screen of a display monitor of an information processing system, includes a position plate that is translationally movable by a user to indicate a corresponding change in position on the display screen and a retention system that restricts the plate movement to the plane of the plate and retains the position plate in its new position notwithstanding a non-horizontal orientation of the position indication device or inadvertent jostling of the device. In alternative embodiments, the position indication device includes an adapter to receive a conventional computer mouse, and the position plate can be of a flexible material in order to fold underneath itself and thereby permit a more compact construction. A hand- or finger-conforming grip for the position indication device is also disclosed.

25 Claims, 5 Drawing Sheets

MANUALLY OPERABLE DEVICE FOR INDICATING POSITION ON A DISPLAY SCREEN

This application is a continuation application of application Ser. No. 07/730,269, filed Jul. 12, 1991, now abandoned.

BACKGROUND OF THE INVENTION

The present invention relates to a novel construction of an input device for use in conjunction with information processing systems such as computers. In particular, the invention is directed to improvements in a position indication device for use with a display monitor of an information processing system.

Much of the following discussion will use a computer, and particularly a personal computer workstation, as an illustrative application of the invention. However, this is not to limit the scope of application of the invention, which can be used in conjunction with a display monitor of any information processing system. Common examples of such information processing systems also include business information processing systems, entertainment systems such as the so-called computer games, and control equipment in medical, industrial and military applications.

A typical personal computer workstation includes some type of display monitor or screen which facilitates the interactive use of the computer by the user. Information typically is provided to the computer by the user through a keyboard and a position indication device. In this context, a position indication device is an input device that is controllable by the user to identify a particular position on the screen of the display monitor, move a cursor on the screen to a selected location, and the like. Examples of such a position indication device include a joystick, a track ball, and the computer "mouse".

Conventional position indication devices suffer from various disadvantages. In the case of a joystick, the user indicates a change in position on the display screen by making a corresponding movement of a lever or stick with the user's fingers. The joystick is useful to move a cursor from one position on the screen to another but is difficult to use in computer aided design (CAD) applications where the user draws shapes and lines. The joystick is found mostly in entertainment and military applications where the user must quickly move a cursor (or other screen object) into the proper position. Manipulation of a joystick involves the small muscles of the fingers that quickly fatigue.

A track ball utilizes a partially exposed ball facing the user that may be rotated by the user's hand to indicate a change in position on the display monitor screen. Manipulation of a track ball usually involves the repeated use of the user's wrist and the small muscles in the hand, thereby quickening user fatigue. Accurate positioning through the use of a track ball is more difficult compared with other position indication devices, because it is more difficult to translate a desired linear movement on the display screen into a rotational movement of the track ball. Also, a distant movement on the display screen generally requires several distinct movements of the track ball. Therefore, it is more difficult to manipulate the track ball and operate function switches at the same time.

The computer mouse typically is formed of a hand held housing through the bottom of which a rotatable, partially exposed ball protrudes, similar to the track ball construction but turned upside down. The computer mouse operates by the user rolling the mouse over a pad or other flat, generally horizontal surface. As with the track ball, the rotation of the ball in the computer mouse is translated into a corresponding repositioning, e.g., of a cursor on the screen of the display monitor.

A principal drawback of the computer mouse is the requirement of a relatively large, flat, unobstructed surface over which the mouse can be moved. In a personal computer workstation, this requirement often means that a significant portion of the user's desk must be unobstructed and dedicated as a mouse pad surface. Due to the space requirement of the pad surface for a conventional computer mouse, it has also been impractical to incorporate a mouse into a computer keyboard. Further, because the proper operation of the mouse depends on the uninterrupted rotation of the mouse ball over the pad surface, the performance of a conventional mouse degrades if the mouse ball skips or slides over the pad surface without rotation. For this reason, the conventional mouse generally is used only on a horizontal pad surface, because use of the mouse on inclined, vertical, or overhead surfaces would increase the likelihood of skipping or sliding of the mouse ball over the surface.

SUMMARY OF THE INVENTION

It is a general object of the present invention to provide an improved position indication device which solves the aforementioned problems in conventional position indication devices, including particularly the computer mouse.

It is a further object to provide an improved position indication device that does not require a large unobstructed surface for its operation.

It is a further object to provide an improved position indication device that can operate in any inclined or overhead orientation.

It is a further object to provide an improved position indication device that is of simple construction and can be manufactured easily and economically.

It is a further object to provide an improved position indication device that conveniently may be incorporated into a computer keyboard.

It is another object to provide an improved position indication device that reduces user fatigue over continued use of the device.

It is another object to provide an improved position indication device that can operate in hostile environments such as factory floors or areas of armed combat.

Other objects, advantages and features of the present invention will become apparent upon reading the following detailed description and appended claims, and upon reference to the accompanying drawings.

In accordance with one embodiment of this invention, usable in conjunction with a display monitor screen, a position indication device that achieves the foregoing objects is a self-contained unit that includes a housing having an opening exposed to the user; a position plate positioned within the housing, accessible to the user through the opening and adapted for translational movement in the plane of the plate; a grip member attached to the movable position plate, to be gripped and moved by the user in order to indicate a desired change in position on a display screen by a corresponding movement of the plate; a retention system that provides a moderate force to retain the position plate in a desired position; and a sensing unit that senses the change in position of the movable plate and provides this information to the control unit for the display monitor screen. The movable plate alternatively may be provided with an adapter to accept a conventional computer mouse, in which case an opening is provided in the movable plate through which the ball of the mouse protrudes, and an underlying stationary plate provides a stationary surface against which the ball may rotate.

In another embodiment of the invention, the position indication device as explained above includes a position plate formed of a flexible material. The housing includes an annular forming structure that redirects the edge of the position plate underneath the plate as the plate is moved across the forming structure. This embodiment provides a more compact construction that includes the advantages of the above described embodiment and is more easily able to be incorporated into a keyboard.

BRIEF DESCRIPTION OF THE DRAWINGS

For a more complete understanding of the present invention, reference is made to the accompanying drawings, wherein.

DESCRIPTION OF THE PREFERRED EMBODIMENTS

The invention will be better understood by the following detailed description of the preferred embodiments. This description refers to FIGS. 1–14 in which the corresponding elements shown in the various Figures are numbered the same. However, the preferred embodiments of the present invention described below are by way of example only and applicant does not limit himself to these embodiments. In certain instances, certain details have been omitted which are not necessary for an understanding of the invention, such as conventional details of fabrication and assembly.

Figure 1:
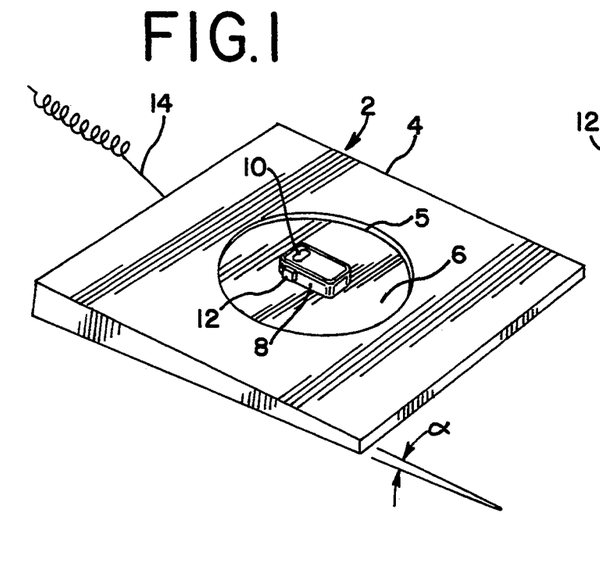
FIG. 1 is a top perspective view of one embodiment of a position indication device in accordance with the present invention.
Figure 2:
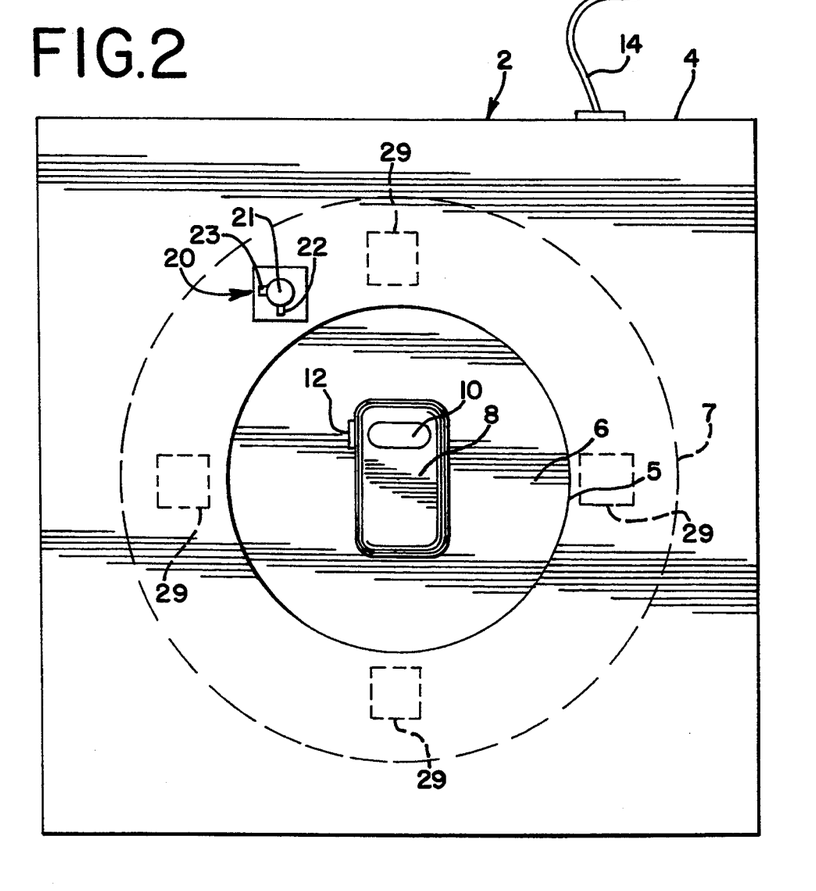
FIG. 2 is a top view of the embodiment shown in FIG. 1.
Figure 3:
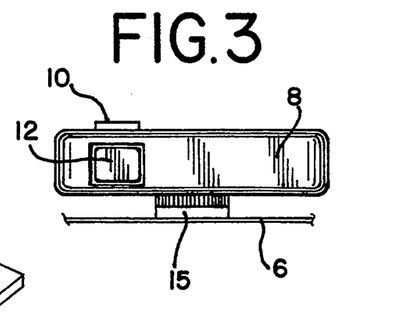
FIG. 3 is a partial side view of the hand grip shown in FIG. 2 and one manner of attachment.

FIGS. 1–3 illustrate a first embodiment of the present invention. A position indication device 2 for use with a display monitor of an information processing system provides position information over the data line 14 in known fashion to a monitor controller (not shown) that controls the positioning, e.g., of a cursor or other object on the display screen of the monitor. In this embodiment, the position indication device 2 is contained within a housing 4 that generally is hollow and is formed of plastic, metal or any other suitable rigid material. The housing 4 includes upwardly extending sidewalls, a generally planar top surface exposed to the user, and a bottom surface. The top surface of the housing 4 may be tilted toward the user at an angle $\alpha$ as shown in FIG. 1 for more convenient access by the user. In a physical reduction to practice of the position indication device 2 as shown in FIGS. 1–3, the housing 4 is constructed with a square footprint, approximately 25 cm. on a side, and has a height of approximately 1½ cm. at the front wall of the housing 4 closest to the user and 3½ cm. at the back wall of the housing. Of course, the housing 4 can be constructed of any appropriate shape and configuration, such as with a circular footprint, and not necessarily square as shown in this embodiment.

The top surface of the housing 4 includes an opening 5 that preferably is circular in shape, although it could be square or any other suitable shape. A planar, somewhat rigid position plate 6 is disposed within the housing 4 underneath the top surface of the housing, and is accessible to the user through the opening 5. Preferably, the position plate 6 is also circular in shape, although it too may be square or another suitable shape.

The position plate 6 is adapted to slide translationally in the housing 4 in the plane of the plate. The position plate 6 is moved through the use of a grip 8, which is secured to the position plate 6 at the center thereof. The grip 8 may be of any desired size and shape, and is adapted to be held and moved by a user's hand. The grip 8 may include one or more buttons 10 to control additional functions of the information processing system, as is well known. Alternatively, such function buttons may be provided on the housing 4 itself. The provision of the function buttons on the grip 8, however, has the advantage of facilitating one-handed operation of the position indication device. Accordingly, the function buttons 10 preferably are positioned for easy access by the user's fingers when the grip 8 is being held.

FIG. 2 shows the position plate 6 in relation to the opening 5 and the side walls of the housing 4. The edge 7 of the position plate 6 is shown in phantom. The circular plate 6 is of larger diameter than the opening 5 and can be moved translationally until the edge 7 contacts the inside surface of a wall of the housing 4. The radius of the opening 5 preferably is about one-half the radius of the position plate 6, or slightly less, so that when the grip 8 is moved all the way to one side of the opening 5, the edge 7 of the position plate 6 is not exposed at the opposite side of the opening 5. This is for aesthetic reasons, as well as providing a substantially self-contained unit to minimize the accumulation of dust and debris within the housing 4. To avoid contact between the edge 7 of the position plate 6 and a wall of the housing 4 before the grip 8 is moved to its extreme position adjacent the edge of the opening 5, the width of the housing 4 should be greater than the sum of the diameters of the position plate 6 and the opening 5. Preferably, the grip 8 is secured to the position plate 6 through a narrow neck or spacer portion 15 as shown in FIG. 3 to allow for maximum translation of the position plate 6 before the edge of the opening 5 is contacted.

A position sensing system 20 for the position indication device 2 is shown diagrammatically in FIG. 2. The position sensing system 20 can be of any known variety; the precise system that is used is not essential to the present invention. For example, as is well known, the position sensing system 20 can operate by means of a position sensing ball 21 that is in rotational engagement with the position plate 6 to translate the movements of the position plate 6 into position control signals. As the position sensing ball 21 rotates in response to a movement of the position plate 6, the orthogonal, e.g. X and Y, sensing units 22 and 23 sense the rotation of the sensing ball 21 and translate that rotation into movement information that is provided to the display monitor controller over the data line 14. The position sensing system 20 is conveniently positioned within the housing 4 and contacts the bottom side of the position plate 6. As another example, an optical movement sensing system can be used in which no position sensing ball is used but the translational movement of the position plate 6 is sensed directly.

A function button 12 may be provided to allow the user to reposition the grip 8 and the position plate 6 without effecting a change in position on the display screen. Pressing the button 12 removes the capability of the position sensing system 20 to sense movement. The operation is similar to a user picking up a standard mouse and repositioning it on its pad.

The overall size of the position indication device 2 will depend in part on the scaling ratio between a movement of the position plate 6 and the corresponding change in position on the display monitor screen. As will be readily apparent to one skilled in the art, the position sensing system 20 may include any suitable mechanical or electronic magnification/reduction system or the display monitor controller may include software (e.g., an "accelerator") to set a desired ratio between movement of the position plate 6 and the position on the display. Thus, for example, using a greater magnification of the change in position indicated on the position indication device 2 would permit shorter movements of the position plate 6 and a reduction in the size of the entire position indication device 2.

The position indication device 2 also includes a retention system 29 (see FIG. 2) that retains the position plate 6 in its plane of movement while allowing translational movement of the position plate 6. A preferred retention system 29 is shown diagrammatically in FIG. 4. The position plate 6, viewed from the edge, is positively retained between opposing support balls 30 and 31. The support balls 30, 31 are retained in housings 32, 33 and are permitted to rotate on bearing systems 34, 36. The support balls 30, 31 are rotatable with a moderate resistance, so that the support balls 30, 31 resist somewhat the translational movement of the intervening position plate 6. This resistance serves two purposes. First, the modest resistance offered by the support balls 30 and 31 will retain the position plate 6 in the new position after it has been moved by the user. Second, the resistance to translational movement is smooth and stable; this affords the user greater precision of movement in that short, jerky, or hesitant movements are suppressed. Greater control over the movement of a position indication device is particularly important to CAD users.

Figure 4:
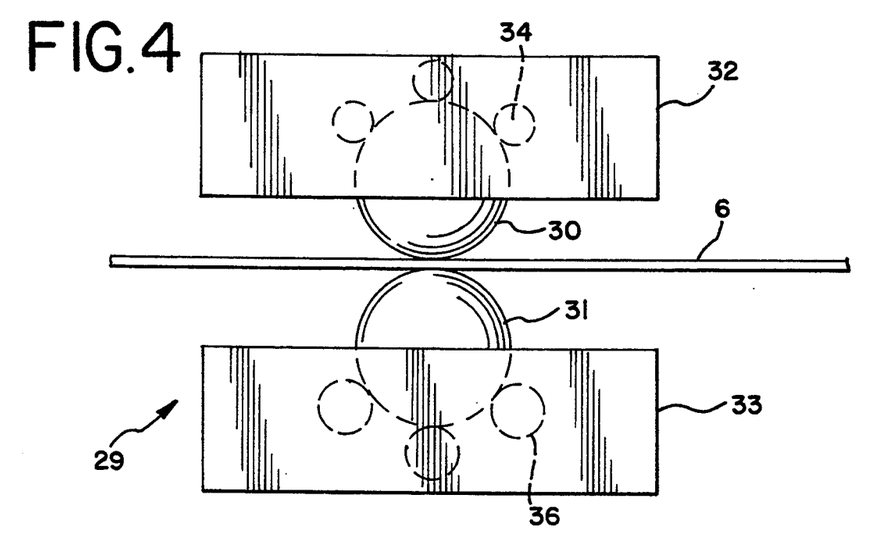
FIGS. 4–6 are diagrammatic, cross-sectional views of three types of position retention system.

The retention system 29 for the position indication device 2 preferably includes a plurality of the support ball systems as shown in FIG. 4, positioned regularly around the position plate 6 and preferably adjacent the opening 5 within the housing 4 (see, e.g., FIG. 2). If desired, one or more of the support balls 30, 31 can also serve as the position sensing ball 21 of the position sensing system 20, and would operate in conjunction with orthogonal sensing devices 22 and 23, as described above in relation to FIG. 2.

Figure 5:
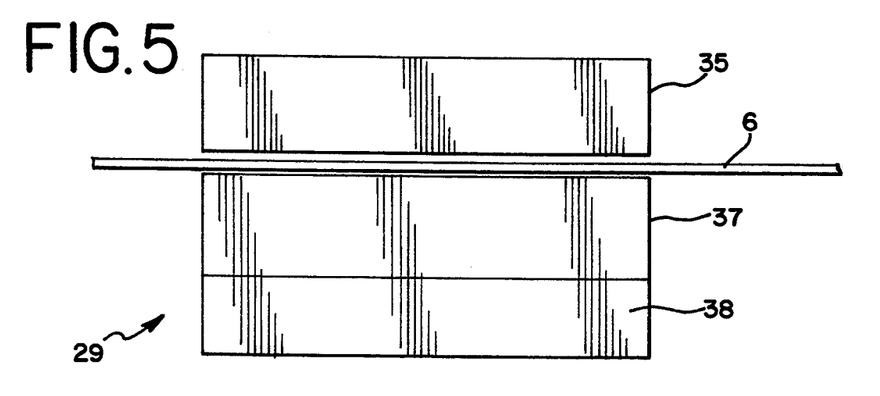
Figure 6:
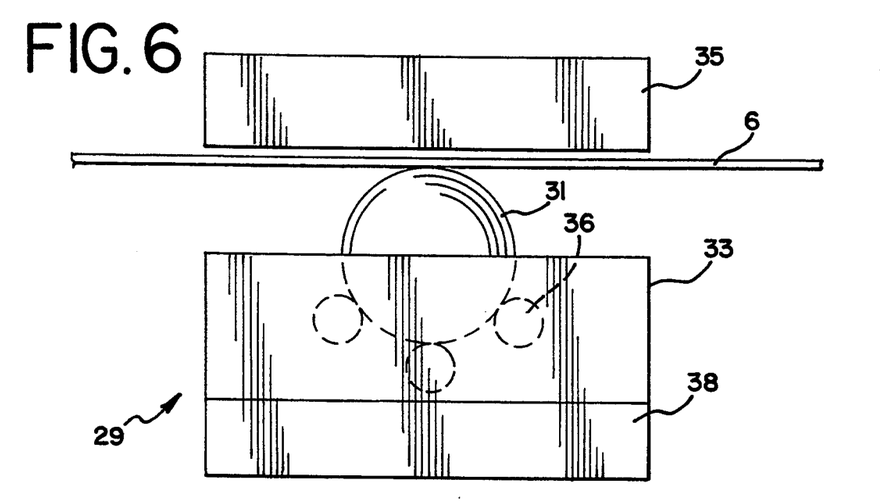

Of course, alternative position retention systems may be used in lieu of the support ball system described above. For example, the position plate 6 may be retained between opposed support strips of felt-like material, sponge rubber, or other resilient material. As illustrated in FIG. 5, the upper strip 35 may be felt-like material and the lower strip 37 may be a low friction material backed by a resilient pad 38. When the user presses down on the grip 8 and position plate 6, the resilient pad 38 compresses slightly and the position plate 6 slides on the strip 37. FIG. 6 shows a position retention system that combines attributes of the first two described retention systems. When the user presses down on the grip 8, the resilient pad 38 compresses slightly, allowing the position plate 6 to roll freely on the ball 31. When the user releases the grip 8, the resilient pad 38 returns to its original shape and the position plate 6 is retained in its new position.

The position plate 6 may also be retained by a support system on its bottom side that urges the plate 6 directly against the bottom side of the top surface of the housing 4 that surrounds the opening 5. The important features of the retention system are that the position plate 6 is substantially restricted to translational movement in the plane of the plate 6, and the plate 6 is retained in a desired position by a modest retention force to resist unwanted movement of the position plate 6.

Thus, in this embodiment of the invention, a mouse-type position indication device is disclosed that does not require a large, flat, unencumbered desk area for operation because the unit is self-contained within the housing 4, and may be used by being placed on any surface. Because it is self-contained, this embodiment is also well suited for use in hostile environments contaminated by dirt, dust, and the like. Further, the retention system in this embodiment allows the position indication device 2 to be used in any orientation. The housing 4 need not be placed on a horizontal surface, but may be oriented at an incline or even overhead. The resistance to the movement of the position plate 6 that is offered by the positive retention system will prevent undesired movement of the position plate 6 due to gravity or inadvertent jostling.

Figure 7:
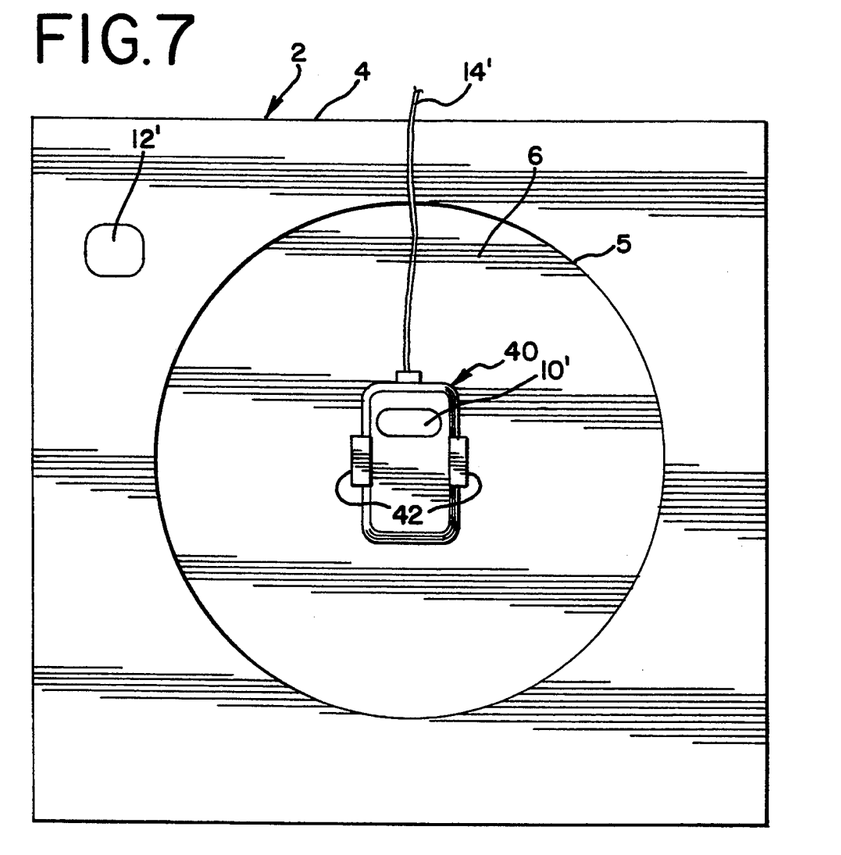
FIG. 7 is a top view of another embodiment of the invention that is adapted to operate with a conventional computer mouse.
Figures 8, 9:
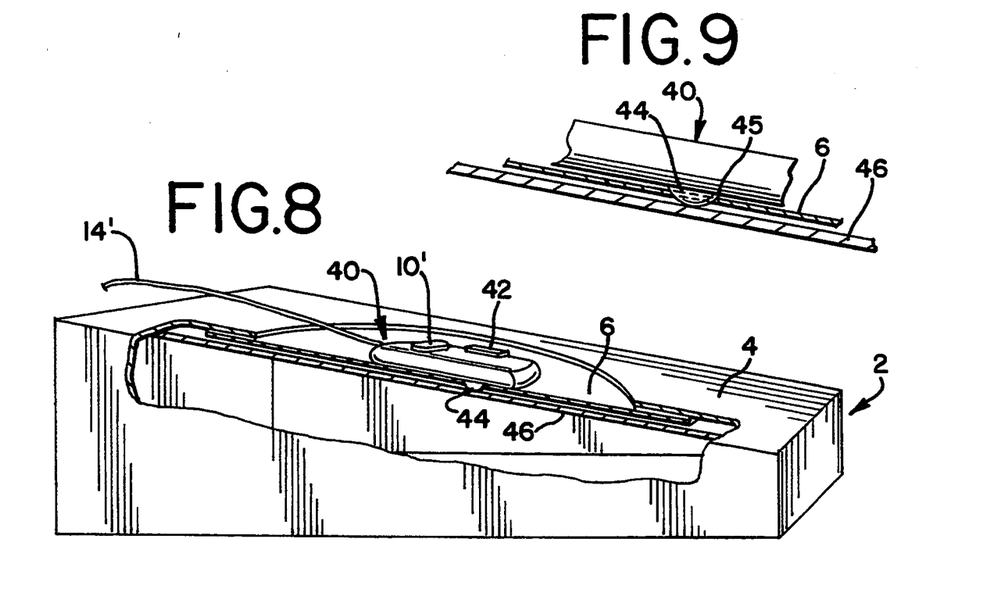
FIG. 8 is a perspective, partial cross-sectional view of the embodiment shown in FIG. 7.
FIG. 9 is a partial, side cross-sectional view showing the operation of a conventional computer mouse in the embodiment of the invention shown in FIGS. 7–8.

FIGS. 7-9 illustrate a second embodiment of the invention. In this embodiment, the position indication device 2 includes the housing 4, a position plate 6, and a position retention system for the plate as generally described above, but the position plate 6 is adapted to receive a conventional computer mouse 40. The computer mouse 40 includes its own data line 14', function button(s) 10', and position sensing system. Consequently, this embodiment of the invention does not include the grip 8, the data line 14, or the position sensing system 20 incorporated within the housing 4.

The conventional computer mouse 40 is removably secured to the position plate 6 at the center thereof by any suitable attachment means, shown diagrammatically in FIGS. 7-8 as attachment clips 42. Underneath the position of the computer mouse 40 there is formed in the position plate 6 an opening 45 (shown best in FIG. 9) through which the sensor ball 44 of the computer mouse 40 can protrude. Closely underlying the position plate 6 is a pad surface 46. The pad surface 46 is a fixed, flat planar surface on which the sensor ball 44 of the computer mouse 40 can rotate in a normal fashion.

In normal operation, the pad surface 46 is in a fixed position with respect to the housing 4 for stability. However, the pad surface 46 may be made to temporarily drop a short distance so that the sensor ball 44 of the computer mouse 40 is not engaged. This way, the computer mouse 40 and position plate 6 can be repositioned without effecting a change in position on the display screen. A function button 12' can be provided on the housing 4 for this release function.

Accordingly, this embodiment of the invention can use an existing computer mouse of a user, yet it benefits from the advantage of the first embodiment in that the position indication device 2 can be used on any surface and positioned in any orientation. Because this embodiment also incorporates a position retention system as described above in connection with the first embodiment, when the position plate 6 is moved through the movement of the computer mouse 40 by a user, the position plate 6 will remain in the new position notwithstanding the orientation or jostling of the position indication device 2.

Figure 10:
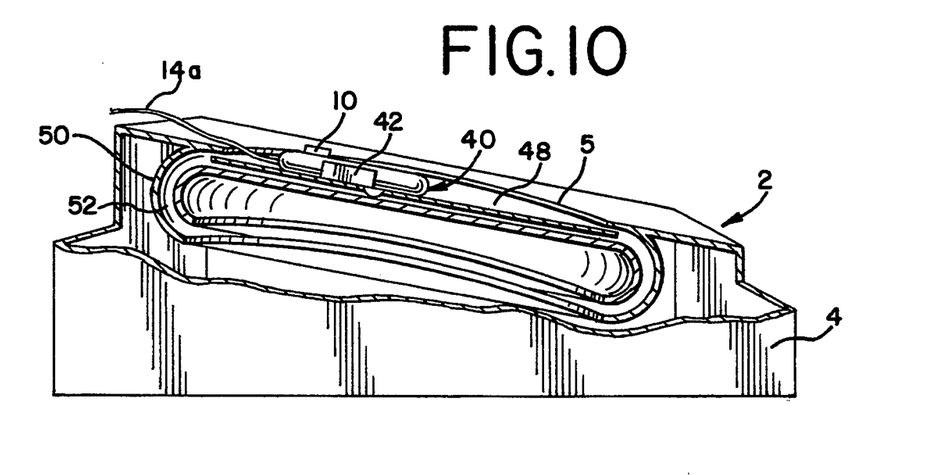
FIG. 10 is a perspective, partial cross-sectional view of another embodiment of the invention utilizing a foldable position plate.

FIG. 10 illustrates a further embodiment of the invention, in which the previously described position plate 6 is flexible so that it may be bent readily at its edge in order to fold underneath itself. This flexible position plate 48 can be used in conjunction with either of the first two described embodiments, but is shown for the sake of illustration in FIG. 10 being used with the second embodiment. The general construction of the position indication device 2 is the same as for the embodiment described in FIGS. 7-9. However, an annular, concave forming member 50 is provided within the housing 4 underneath the top surface of the housing and surrounding the opening 5 in the housing. The forming member 50 provides a curved surface which the edge of the flexible plate 48 engages as the plate 48 is moved, so that the edge of the plate is guided downwardly and under the plate 48. An annular, convex forming member 52 may also be provided in closely spaced relation to the guiding surface of the forming member 50 as a second opposing wall to facilitate the desired bending of the flexible plate 48.

In this embodiment, the position indication device 2 may be made much smaller than the above described embodiments, e.g., one-half the width of the previous embodiments in each translation direction. This is because the housing 4 in this alternative embodiment does not need to accommodate the full translational movement of a rigid position plate 6 within the housing 4. Owing to this space savings, this embodiment is particularly well suited to be incorporated into a computer keyboard.

Figure 11:
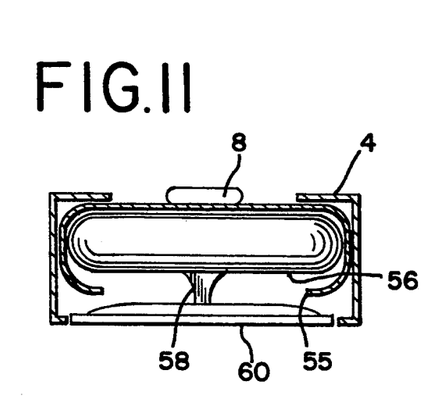
FIG. 11 is a diagrammatic, cross-sectional view of one type of foldable position plate and support structure that may be used in the embodiment generally shown in FIG. 10.

The flexible position plate 48 can be of any suitable construction that permits the plate to fold, but does not allow significant stretching or contracting of the plate when the plate is moved. It may be formed, for example, of a one-piece flexible plastic piece, an assembly of hinged rigid pieces (such as a chain mail construction), or a fabric. An example of the use of a fabric for the flexible position plate is illustrated in FIG. 11. The fabric position plate 54 is a one-piece construction of flexible, yet substantially non-extensible, fabric (e.g., Kevlar material) that is gathered at its edge 55. The fabric position plate 54 is placed in tension over a donut shaped support ring 56, which itself may be supported by any suitable means, such as by stand 58 and base 60, which may be disposed within a housing 4 of a position indication device 2. The edge 55 of the fabric may be secured with a band of stretchable material (e.g., Lycra material) to facilitate the placement and retainment of the fabric position plate 54 around the support ring 56.

Figure 12:
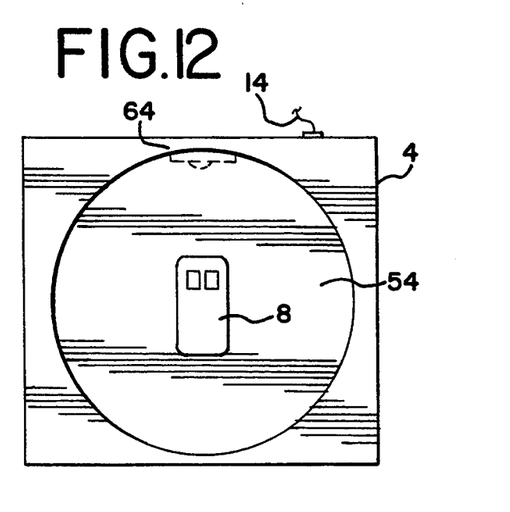
FIG. 12 is diagrammatic, top-sectional view of one type of position sensing system that may be used in conjunction with the embodiment shown in FIG. 11.
Figure 13:
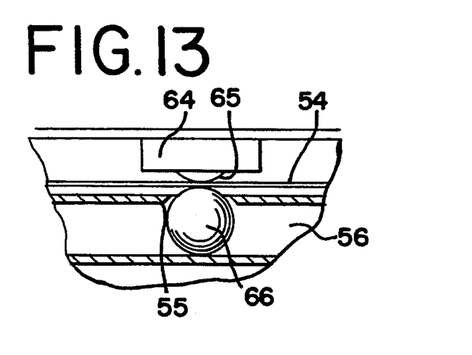
FIG. 13 is a partial cross-sectional view of the portion of the embodiment of the invention shown in FIG. 11 that operates the position sensing system shown in FIG. 12.

This embodiment can also be utilized with any suitable position sensing system. FIGS. 12-13 shows one type of position sensing system 64 that may be used with the embodiment of the invention shown in FIG. 11. The position sensing system 64, shown in phantom in FIG. 12, preferably is located adjacent the outer edge of the support ring 56. As shown in more detail in FIG. 13, the support ring 56 generally is hollow in this instance and includes, at a location along its outer edge, an opening 55 underlying the fabric 54 and through which a rotatable sphere 66 protrudes. The position sensing system 64 is located opposite the sphere 66 and includes rotatable sensing ball 65 that is biased against the sphere 66 through the intervening fabric 54. When the fabric 54 is moved by a user during the operation of the position indication device 2, thereby causing a rotation of the sensing ball 65, movement sensors in the position sensing system 64 sense the rotation of the ball 65 in each of the orthogonal directions as previously described and transmit movement information over the data line 14 to the display monitor controller.

Figure 14:
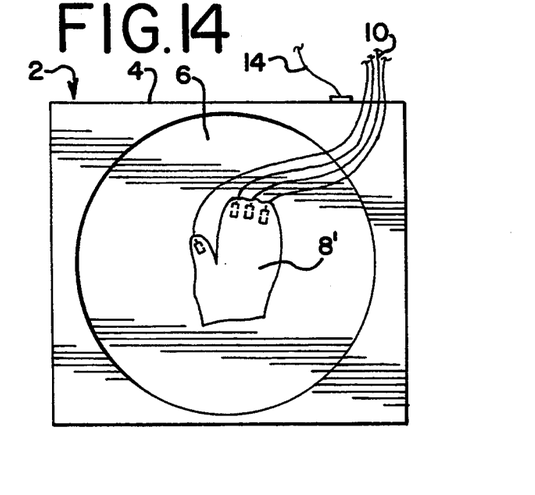
FIG. 14 is a top view of another embodiment of the invention that utilizes a conforming hand grip.

FIG. 14 shows a particular type of grip 8' that may be used with any of the above described embodiments. The grip is formed as a mitt or glove to be conforming to the user's hand (as shown) or, alternatively, selected fingers. Thus, the user can move the position plate 6 with greater ease without having to grasp a handle or other non-conforming grip. With this conforming grip construction, the function button(s) 10 may be placed conveniently beneath the pads of the fingers for ease of access and control during operation. In particular, movement of the position plate 6 through the use of the conforming grip 8' requires only a lateral movement of the user's hand and would not activate the function button(s) 10 positioned beneath the pads of the user's fingers. Yet, because the user's fingers are always located above the function button(s) 10, the buttons may be activated selectively at any time during the operation of the position indication device 2 without the user searching for the switches.

Figure 15:
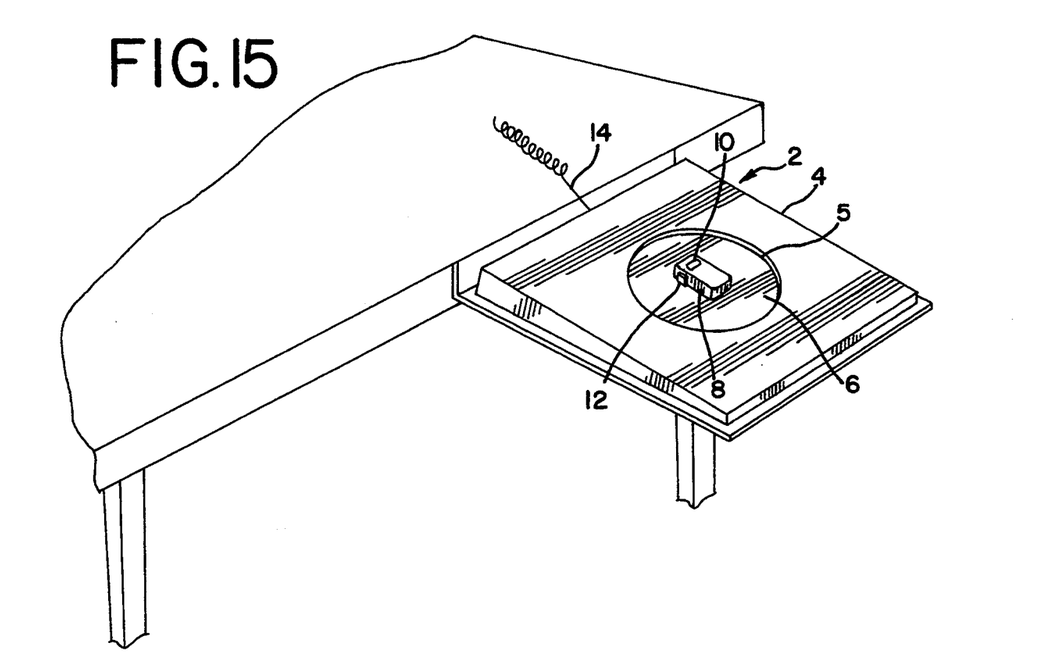
FIG. 15 shows an embodiment of the invention attached to the table top.
Figure 16:
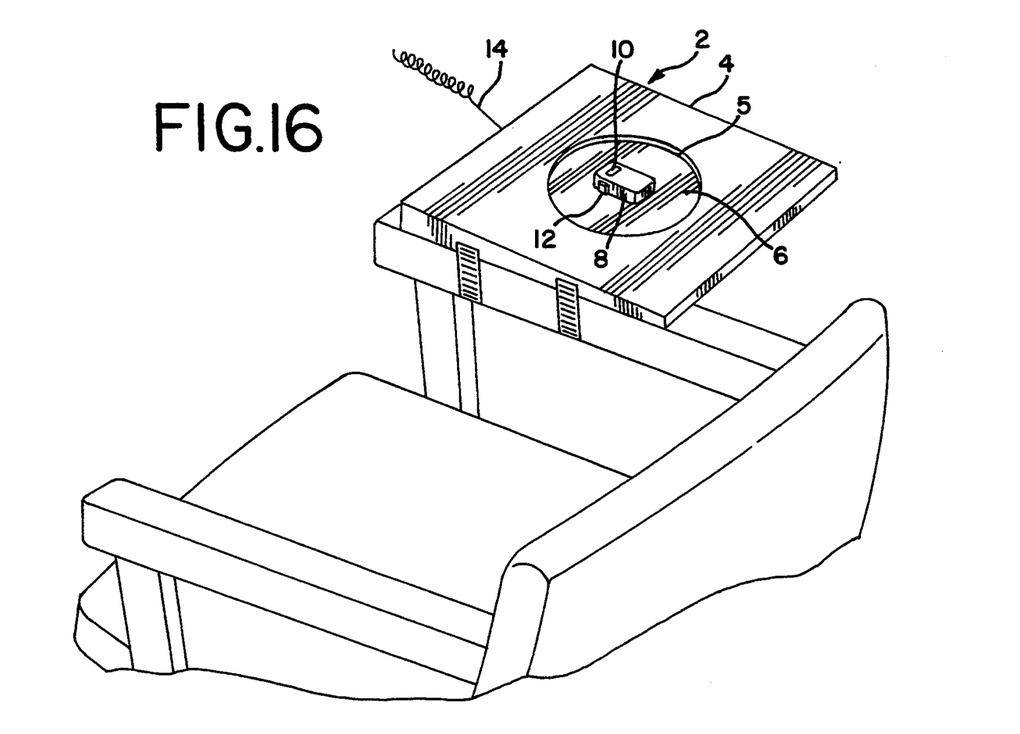
FIG. 16 shows an embodiment of the invention attached to a chair arm rest.

While the above description explains preferred embodiments of the invention, the invention is not limited to these embodiments since modifications and other embodiments of this invention will occur to those skilled in the art to which the invention pertains, particularly upon considering the foregoing disclosure. For example, the position sensing system may be an optical sensing system as mentioned above. The handgrip may be of any shape or size. The entire construction may be made more rugged to withstand hostile environments. In addition, the housing of the position indication device may include an incline adjustment to allow the user to adjust the angle of the top surface of the device for easier access by the user. This also allows the user to use the position indication device on a surface that is not flat or to create an angled work surface. Another modification to this device includes a means to attach the position indication device to a table top (see FIG. 15) or a chair arm rest (see FIG. 16) to allow the user more flexibility in the use of this device away from the display monitor.

It is therefore contemplated by the appended claims to cover modifications and other embodiments that incorporate those features which constitute the essential features of this invention.

What is claimed is:

1. A position indicating device for indicating a position on a display monitor screen, comprising:
    a unitary position plate adapted for movement by a user in any direction in a plane of translational movement of the position plate, where a position of the position plate indicates a corresponding position on the display monitor screen;
    a retention system applying a retention force directly to opposing sides of the position plate at least when the position plate has been moved to a new position, in order to minimize unintended movement of the position plate; and
    a position sensing system directly sensing the translational movement of the position plate that effects a change in position of the position plate and generating at least one signal indicative of the change in position.

2. A position indication device as in claim 1, further including a grip secured to the position plate and adapted to be engaged and moved by the user in order to effect a desired movement of the position plate.

3. A position indication device as in claim 1, wherein the position plate is planar and a change in position of the position plate in the plane of translational movement of the position plate indicates the corresponding change in position on the display monitor screen.

4. A position indication device as in claim 3, wherein the retention system also acts to restrict movement of the position plate substantially to the plane of translation movement of the position plate.

5. A position indication device as in claim 4, wherein the retention system comprises at least one pair of opposed, rotatable support spheres, the spheres being positioned one on each side of the planar position plate in rotating engagement with the position plate and adapted to rotate with moderate resistance.

6. A position indication device as in claim 5, wherein the retention system comprises a plurality of the support sphere pairs, positioned regularly around the planar position plate.

7. A position indication device as in claim 5, wherein the position sensing system comprises at least one of the support spheres, which also acts to sense, through its rotational engagement with the position plate, the change in position of the position plate.

8. A position indication device as in claim 4, wherein the retention system comprises at least one pair of opposed resilient support strips, the support strips being positioned one on each side of the planar position plate in engagement with the position plate and adapted to resist the movement of the position plate with moderate resistance.

9. A position indication device as in claim 4, wherein the retention system comprises at least one resilient support strip and one rotatable support sphere, positioned one on each side of the planar position plate in engagement with the position plate and adapted to resist movement of the position plate with moderate resistance at least when the position plate is stationary.

10. A position indication device as in claim 3, wherein the position plate is rigid.

11. A position indication device as in claim 3, wherein the position plate is flexible.

12. A position indication device as in claim 11, further including a forming member adapted to receive an edge of the flexible position plate over at least a portion of the range of movement of the flexible position plate and direct movement of at least a portion of the flexible position plate in a direction other than the plane of translational movement of the flexible position plate.

13. A position indication device as in claim 11, wherein the flexible position plate is formed of a nonextensible fabric.

14. A position indication device as in claim 13, further including a support member for the fabric to maintain at least a portion of the flexible nonextensible fabric position plate in tension.

15. A position indication device as in claim 2, wherein the grip is adapted to conform to at least a portion of a user's hand.

16. A position indication device as in claim 2, wherein the grip is spaced from the position plate by a neck that is narrower than the grip.

17. A position indication device as in claim 15, wherein the grip is adapted to conform to at least one of the user's fingers.

18. A position indication device as in claim 2, further including at least one switch for controlling at least one selected function of the display monitor screen, the at least one switch being positioned for ready activation by a user's hand in engagement with the grip.

19. A position indication device that is manually operable by a user for indicating a position on a display monitor screen of an information processing system, comprising:
    a substantially closed, hollow housing for the position indication device, including a surface exposed to the user and having an opening therein;
    a planar, unitary position plate disposed within the housing, accessible to the user through the opening and adapted for movement by the user in any direction in a plane of translational movement of the position plate, where a position of the position plate indicates a corresponding position on the display monitor screen;
    a grip secured to the position plate and adapted to be engaged manually and be moved by the user in order to effect a desired movement of the position plate;
    a retention system applying a retention force directly to opposing sides of the position plate at least when the position plate has been moved to a new position in order to minimize unintended movement of the position plate, the retention system also acting to restrict movement of the position plate substantially to the plane of translational movement of the position plate; and
    a position sensing system directly sensing the translational movement of the position plate that effects a change in position of the position plate and generating at least one signal indicative of the change in position that is used to effect a corresponding change in position on the display monitor screen.

20. A position indication device as in claim 19, wherein the position plate is rigid.

21. A position indication device as in claim 19, wherein the position plate is flexible.

22. A position indication device as in claim 21, further including a forming member adapted to receive an edge of the flexible position plate over at least a portion of the range of movement of the flexible position plate and direct movement of at least a portion of the flexible position plate in a direction other than the plane of the position plate.

23. A position indication device as in claim 19, further including means to tilt the position plate at a desired angle.

24. A position indication device as in claim 19, further including means for attaching the position indication device to a table top.

25. A position indication device as in claim 19, further including means for attaching the position indication device to a chair arm.

* * * * *